US012585875B2

(12) United States Patent
Lange et al.

(10) Patent No.: US 12,585,875 B2
(45) Date of Patent: Mar. 24, 2026

(54) DEVICE AND METHOD FOR PROCESSING TEMPORAL EXPRESSIONS FROM UNSTRUCTURED TEXTS FOR FILLING A KNOWLEDGE DATABASE

(71) Applicant: Robert Bosch GmbH, Stuttgart (DE)

(72) Inventors: Lukas Lange, Pforzheim (DE); Jannik Stroetgen, Karlsruhe (DE); Heike Adel-Vu, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 237 days.

(21) Appl. No.: 18/305,896

(22) Filed: Apr. 24, 2023

(65) Prior Publication Data

US 2023/0351108 A1 Nov. 2, 2023

(30) Foreign Application Priority Data

May 2, 2022 (DE) ..................... 10 2022 204 296.4

(51) Int. Cl.
*G06F 40/279* (2020.01)

(52) U.S. Cl.
CPC ................................. *G06F 40/279* (2020.01)

(58) Field of Classification Search
CPC .................................................... G06F 40/279
See application file for complete search history.

(56) References Cited

U.S. PATENT DOCUMENTS

| | | | | |
|---|---|---|---|---|
| 2018/0157958 A1* | 6/2018 | Fourney | .............. | G06F 16/3322 |
| 2021/0174798 A1* | 6/2021 | Wu | ......................... | G06N 3/045 |
| 2022/0210106 A1* | 6/2022 | Angeli | .............. | G06Q 10/1093 |
| 2023/0033211 A1* | 2/2023 | Ferreira Lima | ....... | G06F 40/295 |

FOREIGN PATENT DOCUMENTS

DE 202020102105 U1 4/2020

OTHER PUBLICATIONS

Pustejovsky et al. (James Pustejovsky et al, "The specification language TimeML," (2005) in the language of time: a reader, pp. 545-557, Oxford University Press (Year: 2005).*
Devlin et al., "BERT: Pre-training of deep bidirectional transformers for language understanding," in Proceedings of the 2019 Conference of the North American Chapter of the Association for Computational Linguistics: Human Language Technologies, vol. 1 (Long and Short Papers), pp. 4171-4186, 2019 (Year: 2019).*
Almasian, et al.: "BERT got a Date: Introducing Transformers to Temporal Tagging," arXiv preprint arXiv:2109.14927v2, (2021), pp. 1-13; URL:https://arxiv.org/abs2109.14927v2.

(Continued)

*Primary Examiner* — Bhavesh M Mehta
*Assistant Examiner* — Joseph J. Yamamoto
(74) *Attorney, Agent, or Firm* — NORTON ROSE FULBRIGHT US LLP

(57) ABSTRACT

A method and device for processing temporal expressions from unstructured texts for filling a knowledge database. A temporal expression in a text is determined. A type of the temporal expression is determined as a function of the text. The temporal expression and the type are mapped on a prediction of a value of the temporal expression in a context-free representation of the temporal expression.

12 Claims, 2 Drawing Sheets

(56) References Cited

OTHER PUBLICATIONS

Chang et al., "Sutime: a Library for Recognizing and Normalizing Time Expressions," Proceedings of the Eighth International Conference on Language Resources and Evaluation (LREC'12), 2012, pp. 3735-3740. <extension:/elhekieabhbkpmcefcoobjddigjcaadp/http://www.rec-conf.org/proceedings/lrec2012/pdf/284_Paper.pdf> Downloaded Apr. 24, 2023.

Strötgen et al., "Multilingual and Cross-Domain Temporal Tagging," Language Resources and Evaluation, vol. 47, No. 2, 2013, pp. 269-298. <https://www.scinapse.io/papers/2058070641> Downloaded Apr. 24, 2023.

Bethard "A Synchronous Context Free Grammar for Time Normalization," Proceedings of the 2013 Conference on Empirical Methods in Natural Language Processing, 2013, pp. 821-826. <extension://elhekieabhbkpmcefcoobjddigjcaadp/https://aclanthology.org/D13-1078.pdf> Downloaded Apr. 24, 2023.

Lee et al., "Context-Dependent Semantic Parsing for Time Expressions," Proceedings of the 52nd Annual Meeting of the Association for Computational Linguistics, vol. 1, 2014, pp. 1437-1447. <extension://elhekieabhbkpmcefcoobjddigjcaadp/https://aclanthology.org/P14-1135.pdf> Downloaded Apr. 24, 2023.

Ning et al., "Cogcomptime: a Tool for Understanding Time in Natural Language," Proceedings of the 2018 Conference on Empirical Methods in Natural Language Processing: System Demonstrations, 2018, pp. 72-77. <extension://elhekieabhbkpmcefcoobjddigjcaadp/https://aclanthology.org/D18-2013.pdf> Downloaded Apr. 24, 2023.

Ding et al., "Automatic Rule Generation for Time Expression Normalization," Findings of the Association for Computational Linguistics: EMNLP, 2021, pp. 3135-3144. <extension://elhekieabhbkpmcefcoobjddigjcaadp/https://aclanthology.org/2021.findings-emnlp_269.pdf> Downloaded Apr. 24, 2023.

Laparra et al., "From Characters to Time Intervals: New Paradigms for Evaluation and Neural Parsing of Time Normalizations," Transactions of the Association for Computational Linguistics, vol. 6, 2018, pp. 343-356. <extension://elhekieabhbkpmcefcoobjddigjcaadp/https://aclanthology.org/Q18-1025.pdf> Downloaded Apr. 24, 2023.

Lange et al., "Adversarial Alignment of Multilingual Models for Extracting Temporal Expressions From Text," Proceedings of the 5th Workshop on Representation Learning for NLP, 2020, pp. 103-109. <extension://elhekieabhbkpmcefcoobjddigjcaadp/https://aclanthology.org/2020.repl4nlp-1.14.pdf> Downloaded Apr. 24, 2023.

Strotgen et al., "A Baseline Temporal Tagger for All Languages," Proceedings of the 2015 Conference on Empirical Methods in Natural Language Processing, 2015, pp. 541-547. <extension://elhekieabhbkpmcefcoobjddigjcaadp/https://aclanthology.org/D15-1063.pdf> Downloaded Apr. 24, 2023.

Devlin et al., "BERT: Pre-Training of Deep Bidirectional Transformers for Language Understanding," Proceedings of the 2019 Conference of the North American Chapter of the Association for Computational Linguistics: Human Language Technologies, vol. 1, 2014, pp. 4171-4186. <extension://elhekieabhbkpmcefcoobjddigjcaadp/https://aclanthology.org/N19-1423.pdf> Downloaded Apr. 24, 2023.

Pustejovsky et al., "The Specification Language TimeML," the Language of Time: a Reader, 2005, pp. 1-15. <https://www.researchgate.net/publication/242423032_The_Specification_Language_TimeML> Downloaded Apr. 24, 2023.

* cited by examiner provide temporal expression ~300 determine reference data for the text ~302 determine temporal expression in a test ~304 determine type of temporal expression ~306 map temporal expression and the type ~308 determine temporal characteristic ~310 fill knowledge database ~312

DEVICE AND METHOD FOR PROCESSING TEMPORAL EXPRESSIONS FROM UNSTRUCTURED TEXTS FOR FILLING A KNOWLEDGE DATABASE

CROSS REFERENCE

The present application claims the benefit under 35 U.S.C. § 119 of German Patent Application No. DE 10 2022 204 296.4 filed on May 2, 2022, which is expressly incorporated herein by reference in its entirety.

FIELD

The present invention relates to a device and to a method for processing temporal expressions from unstructured texts for filling a knowledge database.

BACKGROUND INFORMATION

To fill the knowledge database, an extraction and the normalization of temporal expressions from unstructured texts may be provided.

Both subtasks may be addressed together, for example, as described in Chang & Manning 2012, "SUTime: A library for recognizing and normalizing time expressions" (aclanthology.org/L12-1122/) or in Strötgen & Gertz 2013, "Multilingual and cross-domain temporal tagging" (link.springer.com/article/10.1007/s10579-012-9179-y.

Both subtasks may be handled separately from one another, for example, as described in Bethard 2013, "A Synchronous Context Free Grammar for Time Normalization" (aclanthology.org/D13-1078/) or in Lee et al. 2014, "Context-dependent Semantic Parsing for Time Expressions" (aclanthology.org/P14-1135/).

These normalization approaches and the normalization approaches described in Ning et al, 2018 "CogCompTime: A Tool for Understanding Time in Natural Language" (aclanthology.org/D18-2013/) and in Ding et al. 2021, "Automatic rule generation for time expression normalization" (aclanthology.org/2021.findings-emnlp.269) are based on rule systems.

SUMMARY

A computer-implemented method for normalizing temporal expressions from unstructured texts for filling a knowledge database according to an example embodiment of the present invention includes a deep learning-based method for normalizing temporal expressions.

One advantage of the deep learning-based method for normalization as opposed to a rule-based normalization is the potential transfer to new languages and text genres, which could otherwise only be covered with much effort by the creation of new rules.

In contrast to normalization using fixed rules, it is possible with the deep learning-based method for normalization to also normalize temporal expressions that are not covered by a static rule system. This means, the deep learning-based method for normalization is more flexible as opposed to a rule-based approach with respect to disruptive sources in texts such as, for example, minor spelling errors and unknown words, whose meaning, however, may be deduced from the context.

According to an example embodiment of the present invention, the deep learning-based method for normalization may be used in combination with different extraction models, for which it is not explicitly required to be trained. The extraction may take place in an exemplary extraction model using the rule-based approach or using a neural network. The extraction may take place by a user, who him/herself sets limits for expressions that are to be normalized.

According to an example embodiment of the present invention, the method for processing temporal expressions from, in particular, unstructured texts for filling a knowledge database provides that a temporal expression in a text is determined, a type of the temporal expression being determined as a function of the text, and the temporal expression and the type being mapped in a context-free representation of the temporal expression on a prediction of a value of the temporal expression. The temporal expression and/or the type is/are determined as a function of text, for example, in a rule-based manner or using a neural network trained for such purpose.

According to an example embodiment of the present invention, a model is preferably designed to map the temporal expression and the type on the prediction, the temporal expression and the type being mapped on the prediction using the model. The value of the temporal expression is determined, for example, using a transformer as a model trained for such purpose, the transformer being designed, i.e., trained, to map the temporal expression and the type on the prediction. Instead of the transformer, another model trained for such purpose, for example, a deep learning model, in particular, a recurrent neural network or a convolutional neural network may also be provided, which is designed, i.e., trained, to map the temporal expression and the type on the prediction.

According to an example embodiment of the present invention, the text that includes the temporal expression is preferably provided, a reference date for the text being determined or predefined, a temporal characteristic being determined as a function of the context-free representation and as a function of the reference date, and the knowledge database being filled with the temporal characteristic. In this way, the knowledge database is filled with a temporal characteristic, which is anchored in a temporal context predefined by the text.

According to an example embodiment of the present invention, a temporal expression is preferably provided, a context-free representation being provided and the model being trained as a function of the temporal expression and of the context-free representation to map the temporal expression on a prediction for the context-free representation. The resulting transformer is flexible with respect to disruptive sources in texts such as, for example, spelling errors and unknown words, whose meaning, however, may be deduced from the context. The resulting model, for example, the transformer or the deep learning model, and the determination of the context-free representation are applicable to multiple languages.

According to an example embodiment of the present invention, the context-free representation includes preferably multiple slots, the temporal expression being represented by a content of the slots in a context-free manner, at least one of the slots being masked and the model being trained as a function of the temporal expression to map the temporal expression on a prediction for a masked content of the at least one masked slot. In this way, the model is very efficiently trained, since fewer training data are required as compared to a context-dependent representation.

In a first training phase, in which at least one slot is unmasked and in which at least one slot is masked, the model is preferably trained to map the temporal expression and an unmasked content of the at least one slot, which is unmasked, on a prediction for a masked content of the at least one slot, which is masked. In this way, the model is very efficiently trained.

In a second training phase, in which, in particular, all the slots are masked, the model trained in the first training phase is preferably trained to map the temporal expression on a prediction for a content of the slots. In this way, the model is very efficiently trained and learns the complete prediction of the context-free representation.

The model is preferably trained in multiple iterations, fewer slots being masked in a first iteration than in a second iteration, in particular, in a second iteration that is carried out after the first iteration. In this way, the model is very efficiently trained, in particular, if only few training data are present, for example, in diverse languages.

Using the model, either a digit, or a number, or an operator, in particular, an arithmetic operator, or a letter, or a word element, or a word or a placeholder is preferably determined from a predefined vocabulary as a prediction for a slot of the context-free representation. Different vocabularies may be used for different context-free representations. The vocabulary is predefined according to the desired context-free representation. As a result, the prediction by the model is very reliable.

The model is used to determine, preferably for each masked content of a slot, a probability distribution over the vocabulary and, as a function of the probability distribution, the content of the slot. In this way, the model is very efficiently trained and further analyses or alternative predictions on the basis of the probability distribution are made possible.

According to an example embodiment of the present invention, it may be provided that a text excerpt from the text that includes the temporal expression is determined, in particular, in a rule-based manner as a function of the text, and the prediction being determined using the model as a function of the text excerpt that includes the temporal expression. The text excerpt is, for example, a sentence. The prediction is based on the temporal expression in its context. This further improves the prediction.

According to an example embodiment of the present invention, it may be provided that a text excerpt from the text that includes the temporal expression is determined, in particular, in a rule-based manner as a function of the text, and the model being trained as a function of the text excerpt that includes the temporal expression.

A device for processing temporal expressions from, in particular, unstructured texts, for filling a knowledge database includes a computing device, which is designed to carry out the method, according to an example embodiment of the present invention. The device has advantages corresponding to the method.

According to an example embodiment of the present invention, a computer program, which includes computer-readable instructions, upon execution of which by a computer the method proceeds, has corresponding advantages.

BRIEF DESCRIPTION OF THE DRAWINGS

Further advantageous specific embodiments may be derived from the following description and from the drawings.

DETAILED DESCRIPTION OF EXAMPLE EMBODIMENTS

Figure 1:
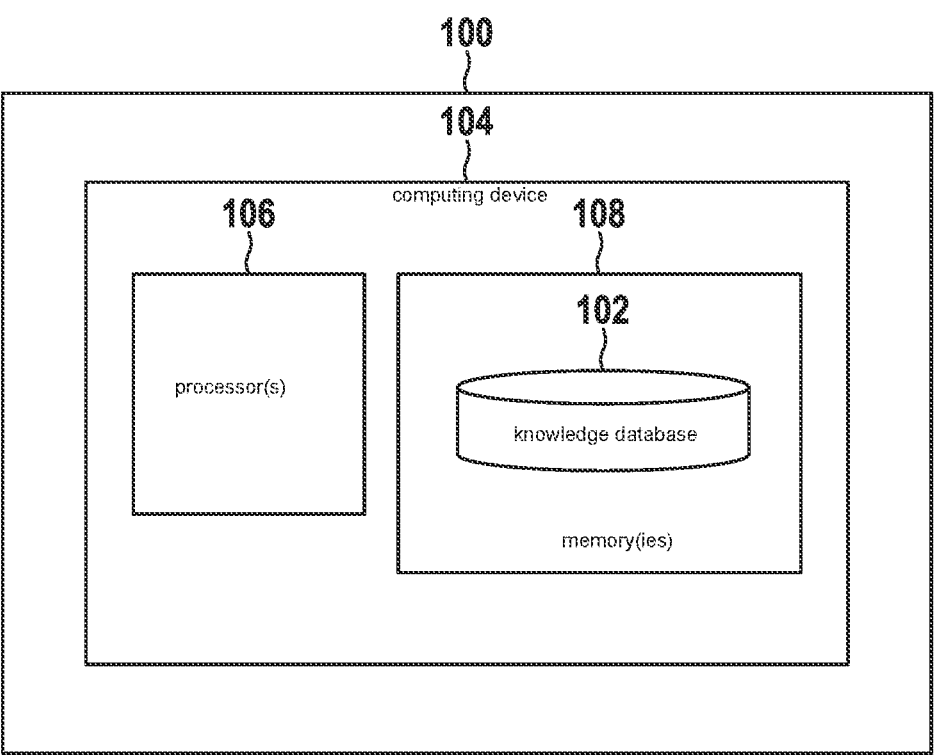
FIG. 1 schematically shows a representation of a device for processing temporal expressions from unstructured texts for filling a knowledge database, according to an example embodiment of the present invention.

A device 100 for processing temporal expressions from, in particular, unstructured texts for filling a knowledge database 102 is schematically represented in FIG. 1.

Examples of temporal expressions are, for example, dates, for example, January 2022, and time indications, for example, 13:00, as well as time spans, for example, 5 months long.

Examples of applications in which the filling of knowledge database 102 is provided, are a creation or expansion of a knowledge graph (knowledge base) or of a database including temporal characteristics. For example, based on the temporal expressions, validity periods for entries in the former may be established and events that represent the temporal expressions may be assigned to particular points in time.

Device 100 includes a computing device 104, which is designed to carry out a method described below for processing temporal expressions from unstructured texts for filling knowledge database 102.

Computing device 104 includes, for example, at least one processor 106 and at least one memory 108. The at least one memory 108 is designed, for example, to store knowledge database 102. The at least one memory 108 is designed, for example, to store instructions, for example, a computer program, upon execution of which by the at least one processor 106, the method proceeds.

The method is described below as exemplified by an extraction and a subsequent normalization of the temporal expressions. Extraction and normalization are parts of a "Temporal Tagging."

The extraction in the example includes a typing. Given a text, the task of the extraction is to find the limits of temporal expressions. These are generally the so-called character-offsets which, using two numbers, establish the clear limits of the expression within the text. For example, start at character no. 20 and end at character no. 30 (including) for an expression having a length of 11 characters.

The extraction is carried out, for example, in a rule-based manner. For example, an expression is recognized as a temporal expression when the expression coincides with a pattern for a temporal expression according to predefined rules.

The extraction is carried out, for example, using an approach for deep learning, in particular, by solving a sequence labeling problem or a Seq2Seq problem.

The extraction by solving a sequence labeling problem is described in Laparra et al. 2018, "From Characters to Time Intervals: New Paradigms for Evaluation and Neural Parsing of Time Normalizations" (aclanthology.org/Q18-1025/) and in Lange et al. 2020, "Adversarial Alignment of Multilingual Models for Extracting Temporal Expressions from Text" (aclanthology.org/2020.repl4nlp-1.14/).

The method is described by way of example of a text, which includes temporal expressions.

The typing in the example is carried out using HeidelTime. HeidelTime is described, for example, in Strötgen & Gertz 2015, "A Baseline Temporal Tagger for all Languages" (aclanthology.org/D15-1063/).

The typing of the temporal expressions takes place, for example, in one of four classes (DATE, TIME, DURATION, SET). Other, more or fewer, classes may be provided.

In the example, the typing of a temporal expression using the extraction of the temporal expression takes place extensively. An extraction of temporal expressions and a subsequent typing may also be provided.

The output of the extraction and typing determined per temporal expression in the example are its annotation limits in the text and a type.

For an exemplary text excerpt "The Eta Aquariiden meteor shower will appear in May." the temporal expression "May" for example, is extracted and typed with the type DATE.

In the text excerpt in the example, the temporal expression "May" is extracted using HeidelTime and is annotated in the text excerpt itself with the type DATE. The resulting annotated text excerpt is "The Eta Aquariiden meteor shower will appear in <TIMEX3 type="DATE">May</TIMEX3>."

As part of the normalization, the temporal expression, "May" in the example, is supplemented by a context-free representation of the temporal expression. The context-free representation in the example is used together with the temporal expression in a TIMEX3 expression instead of the temporal expression in the text excerpt. For the example, this results in the text excerpt:

"The Eta Aquariiden meteor shower will appear in <TIMEX3 type="DATE"value="UNDEF-year-05">May</TIMEX3>."

TIMEX3 is described, for example, in James Pustejovsky et al, "The specification language TimeML," in *The language of time: a reader*, pages 545-557, Oxford University Press.

In HeidelTime in the example, the temporal expression "May" with a position of the letter M in the text: START=42 and a position of the letter i in the text: END=44 is assigned a context-free representation kuRepr of the temporal expression kuRepr="UNDEF-year-05".

For the context-free representation kuRepr, a value is provided in the example in the TIMEX 3 expression.

The text excerpt that includes the TIMEX 3 expression is used in the example as an input variable for the normalization.

The normalization in the example includes a Masked Language Modeling. This means that the normalization is modeled as a Masked Language Modeling problem. Masked Language Modeling includes, for example, a transformer according to a language model such as BERT.

BERT is described, for example, in Devlin et al. 2014, "BERT: Pre-training of Deep Bidirectional Transformers for Language Understanding" (aclanthology.org/N19-1423/).

Instead of the transformer, another model trained for such purpose, for example, a deep learning model, in particular, a recurrent neural network or a convolutional neural network may also be provided.

In a Masked Language Modeling problem, a particular section in the context-free representation is masked with a mask and the transformer is trained to fill the mask.

In a training of the transformer, the latter is trained to determine for a temporal expression a prediction for its context-free representation as a function of the temporal expression.

Multiple slots are used in the example for the prediction of the context-free representation using the transformer.

The context-free representation kuRepr in the value in the TIMEX3 expression is represented by a content of the slot.

The content of a slot in the example includes either a part of the context-free representation or a placeholder. The slots in the example include a predefined, invariable length. The slots in the example have the same length. Slots having different lengths may also be defined. The slots in the example each have a different semantic meaning.

For a date specification, for example, one slot each is provided for a day specification with two digits and a month specification with two digits and two slots for a year specification. For the year specification, for example, a slot is provided with two digits for a year specification and a decade specification and a slot with two digits is provided for a century specification and a millennium specification. An order of the slots is defined in the example. The content of the slots is unambiguously assigned according to its meaning for the temporal expression. Time indications shorter than a day are stored, for example, in three further slots, one with two digits for hour specifications, one with two digits for minute specifications and one with two digits for second specifications. It may be provided that at least one further slot is provided. The content of the at least one further slot may be a function call. The function call may be identified by an operator such as "plus" or "minus." The content of at least one other slot may be an argument for the function call. The content of the at least one further slot may include additional information. Additional information is, for example, a designation of a date specification as before Christ or after Christ, or a designation of at least one other slot as an indication of a time period or of a holiday. For example, the content BC or AD is for a year before or after Christ. For example, the content of four slots is this-day-plus-2 for the day after tomorrow or this-day-minus-1 for yesterday. For example, the content of a slot designates a holiday. For other expressions, for example, UNDEF, no slot is provided, since this expression is implicitly assumed if a temporal expression is processed, which includes particular words such as "next" or "last."

The content and a predefined assignment of the slots to parts of the context-free expression allows the context-free expression to be reconstructed.

Non-utilized slots in the example are provided with a placeholder. Non-utilized slots are slots for which no value is included in the context-free representation or for which the transformer predicts that no value is included in the context-free representation.

Eleven slots are used in the example. It may be provided to use another number of slots. The transformer is designed to predict the content of the slots as a function of the temporal expression. The transformer in the example is designed to predict the content of the slots as a function of the text excerpt that includes the temporal expression. The transformer in the example is designed to predict the content of the slots as a function of the text excerpt that includes the TIMEX 3 expressions.

One or multiple slots are masked in the training using a mask. The transformer is trained to determine a preferably matching prediction for a masked slot or for multiple masked slots.

The text excerpt including the TIMEX 3 expression in the example is provided in the transformer and a probability distribution across possible uses for the respective mask is calculated as the output. The transformer in the example includes weights, for example, an artificial neural network with weights.

Backpropagation is used in the example in order to adapt the weights of the transformer.

In the example, the temporal expression is normalized using the transformer by predicting its context-free representation. It may be provided to determine a specific value in the TIMEX 3 expression using the transformer, i.e. the context-free representation kuRepr. In the example, a content 05 of a slot for the month specification, for example, is predicted for the temporal expression "May", the content of the other slots being the placeholder. In this case, the content 05 is mapped in a rule-based manner onto the context-free representation kuRepr="UNDEF-year-05".

The context-free representation predicted for the temporal expression in the example represents a normalized expression.

The filling of the knowledge database in the example includes two partial-aspects:

1. If the temporal expression is a relative expression in the text, the latter is anchored using a predefined reference date. For example, the temporal expression "yesterday" is meaningfully determined using a predefined reference date.

2. If the temporal expression is an implicit expression from the text such as, for example, Christmas Eve, the latter is resolved by the semantic knowledge that it involves the evening of December 24.

The knowledge database in the example includes entities and relations with which entities are linked, preferably in pairs, among one another. An example of the knowledge database is a knowledge graph, which represents entities as nodes and relations as edges between nodes. The knowledge database in one example includes more than 100 entities. The knowledge database in one example includes more than 1,000 entities. The knowledge database in one example includes more than 10,000 entities. The knowledge database in one example includes more than 100 relations. The knowledge database in one example includes more than 1,000 relations. The knowledge database in one example includes more than 10,000 relations.

The text in the example includes at least one temporal expression. The text in one example includes at least 100 temporal expressions. The text in one example includes at least 1,000 temporal expressions. The text in one example includes at least 10,000 temporal expressions. The text in the example includes a reference date. The text in one example includes more than 100 reference dates. The text in one example includes more than 1,000 reference dates. The text in one example includes more than 10,000 reference dates.

The method for processing temporal expressions from, in particular, unstructured texts for filling knowledge database 102 includes training steps and inference steps. The aim of the training steps is to train the transformer to predict the context-free representation for a temporal expression from a text or for multiple expressions from a text. The aim of the inference steps is to use the transformer to predict the context-free representation for a temporal expression from a text or for multiple temporal expressions from a text.

The aim of filling the knowledge database is to use the context-free representation or the context-free representations, which are determined with the aid of the inference steps for temporal expressions in the text, to add an entity or multiple entities or a relation or multiple relations or an attribute for these to the knowledge database.

The training steps may be carried out separately from the inference steps. The inference steps may be carried out separately from the training steps, in particular, using a previously trained transformer.

Figure 2:
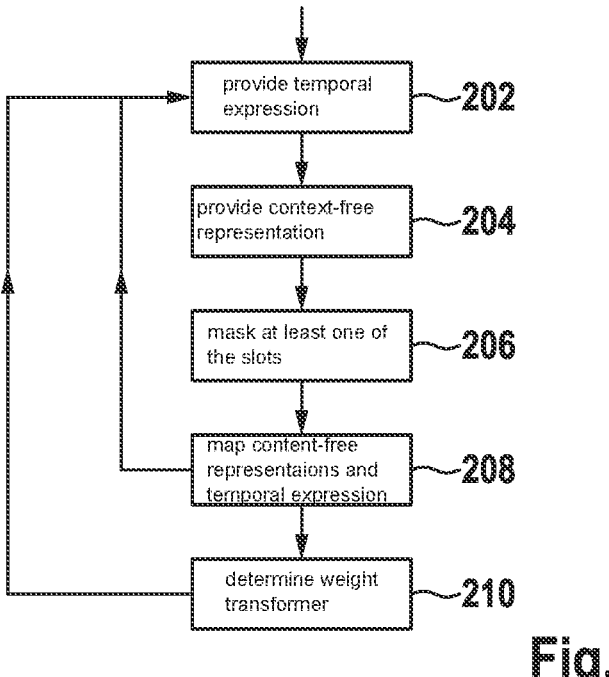
FIG. 2 shows training steps in a method for processing temporal expressions from unstructured texts for filling a knowledge database, according to an example embodiment of the present invention.

The training steps are represented in FIG. 2.

A temporal expression is provided in a step 202.

In one example, a text excerpt, for example, a sentence, is determined from the text that includes the temporal expression.

The temporal expression is determined in a text, for example, in a rule-based manner.

In a step 204, a context-free representation kuRepr is provided.

The context-free representation kuRepr in one example includes multiple slots. The temporal expression is represented by a content of the slots in a context-free manner.

In one example, the text excerpt is provided, which includes the TIMEX 3 expression for the temporal expression and its context-free representation.

In a step 206, at least one of the slots of the context-free representation kuRepr is masked.

The transformer in one example is trained in multiple iterations. In a first iteration, fewer slots are masked than in a second iteration. The second iteration in one example is carried out after the first iteration.

In a step 208, the context-free representation kuRepr and the temporal expression are mapped using the transformer on a prediction for the context-free representation kuRepr. In one example, the text excerpt that includes the temporal expression is mapped on the prediction using the transformer. In one example, the text excerpt that includes the TIMEX 3 expression for the temporal expression is mapped using the transformer on the prediction.

It may be provided that in a first training phase, at least one slot is unmasked and at least one slot is masked. In the first training phase, the temporal expression and a content of the at least one slot, which is unmasked, are mapped using the transformer on a prediction for a content of the at least one slot, which is masked.

It may be provided that in a second training phase, the slots, in particular, all slots, are masked. In the second training phase the temporal expression is mapped using the transformer trained in the first training phase on a prediction for a content of the slots.

Using the transformer, either a digit, or a number, or an operator, in particular, an arithmetic operator, or a letter, or a word element, or a word, or a placeholder is determined in one example as the prediction from a predefined vocabulary.

The text excerpt "The Eta Aquariiden meteor shower will appear in <TIMEX3 type="DATE" value="UNDEF-year-05">May</TIMEX3> in the example includes the context-free representation kuRepr="UNDEF-year-05". The transformer in the example is trained to predict as content for the slot defined therefor the digits 05 by an output of a transformer provided for this slot.

Examples of further predictions are specified below.

A text excerpt " . . . day after tomorrow . . . " is represented, for example, by a context-free representation "UNDEF-this-day-PLUS-2", for which the word "this" is predicted as content using the transformer at an output of the transformer provided for a first slot, the word "day" as content at an output of the transformer provided for a second slot, the operator PLUS as content at an output of the transformer provided for a third slot, and the digit 2 as content at an output of the transformer provided for a fourth slot.

In one example, a probability distribution across the vocabulary and, as a function of the probability distribution, the content of the slot, are determined for each masked content of a slot using the transformer.

If the context-free representation includes multiple slots, the context-free representation and the temporal expression are mapped using the transformer on a prediction for a content of the at least one masked slot.

Steps 202 through 208 are carried out in one training epoch in the example for a plurality of temporal expressions from the text.

In a step 210, at least one weight of the transformer is determined. The weight is determined, for example, as a function of a deviation of the prediction for the context-free representation from the context-free representation. If the context-free representation includes multiple slots, the weight is determined as a function of a deviation of the prediction for the masked content of at least one of the slots from the masked content of the at least one slot. The weight in the example is determined by backpropagation as a function of a plurality of deviations, which is determined for the plurality of temporal expressions from the text.

Step 210 in the example is carried out for a plurality of training epochs.

Figure 3:
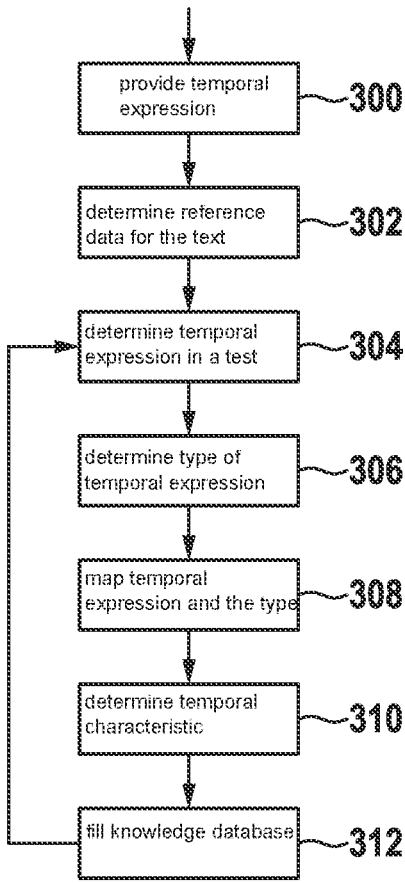
FIG. 3 shows inference steps in the method for processing temporal expressions from unstructured texts for filling a knowledge database, according to an example embodiment of the present invention.

The inference steps are represented in FIG. 3. For the inference, the transformer is designed to map the temporal expression and the type on the prediction for a context-free representation of the temporal expression.

The text that includes the temporal expression is provided in a step 300.

In a step 302, a reference date for the text is determined or predefined. For example, the reference date is determined from the text, in particular, in a rule-based manner.

A temporal expression in a text is determined in a step 304, in particular, in a rule-based manner.

In one example, a text excerpt is determined from the text that includes the temporal expression, in particular, in a rule-based manner as a function of the text.

The type of the temporal expression is determined in a step 306, in particular, in a rule-based manner, as a function of the text.

In a step 308, the temporal expression and the type are mapped using the transformer on the prediction for the context-free representation.

Using the transformer, either a digit, or a number, or an operator, in particular, an arithmetic operator, or a letter, or a word element, or a word, or a placeholder is determined in one example as the prediction from a predefined vocabulary.

For each slot, a probability distribution across the vocabulary and, as a function of the probability distribution, its content, is determined in one example using the transformer.

In one example, the prediction is determined using the transformer as a function of the text excerpt that includes the temporal expression.

In a step 310, a temporal characteristic is determined as a function of the context-free representation and as a function of the reference data.

The knowledge database is filled with the temporal characteristic in a step 312.

Step 304 is subsequently carried out.

Steps 304 through 312 in the example are carried out until the temporal expressions present in the text are processed.

What is claimed is:

1. A computer-implemented method for processing temporal expressions from unstructured texts for filling a knowledge database, the method comprising:

determining a temporal expression in a text;

determining a type of the temporal expression as a function of the text; and mapping the temporal expression and the type on a prediction of a value of the temporal expression in a context-free representation of the temporal expression, wherein:

a model is configured to map the temporal expression and the type on the prediction, the temporal expression and the type being mapped on the prediction using the model, and the temporal expression is provided, the context-free representation being provided, and the model is trained as a function of the temporal expression and of the context-free representation to map the temporal expression on a prediction for the context-free representation.

2. The method as recited in claim 1, wherein the text that includes the temporal expression is provided, a reference date for the text being determined or predefined, a temporal characteristic being determined as a function of the context-free representation and as a function of the reference date, and the knowledge database being filled with the temporal characteristic.

3. The method as recited in claim 1, wherein the context-free representation includes multiple slots, the temporal expression being represented by a content of the slots in a context-free manner, at least one of the slots being masked and the model is trained as a function of the temporal expression to map the temporal expression on a prediction for a masked content of the at least one masked slot.

4. The method as recited in claim 3, wherein the model is trained in a first training phase, in which the at least one slot is unmasked and in which at least one slot is masked, to map the temporal expression and an unmasked content of the at least one slot, which is unmasked, on a prediction for a masked content of the at least one slot, which is masked.

5. The method as recited in claim 4, wherein the model trained in the first training phase is trained in a second training phase, in which all of the slots are masked, to map the temporal expression on a prediction for a content of the slots.

6. The method as recited in claim 3, wherein the model is trained in multiple iterations, fewer slots being masked in a first iteration than in a second iteration that is carried out after the first iteration.

7. The method as recited in claim 1, wherein, using the model as the prediction, either a digit, or a number, or an arithmetic operator, or a letter, or a word element, or a word, or a placeholder is determined from a predefined vocabulary.

8. The method as recited in claim 7, wherein the model is used to determine, for each masked content of a slot, a probability distribution across the vocabulary and, as a function of the probability distribution, the content of the slot.

9. The method as recited in claim 1, wherein a text excerpt from the text is determined in a rule-based manner as a function of the text, which includes the temporal expression, and the prediction being determined using the model as a function of the text excerpt that includes the temporal expression.

10. The method as recited in claim 1, wherein a text excerpt from the text is determined in a rule-based manner as a function of the text, which includes the temporal expression, and the model being trained as a function of the text excerpt that includes the temporal expression.

11. A device configured to process temporal expressions from unstructured texts for filling a knowledge database, the device comprising:

a computing device configured to:

determine a temporal expression in a text, determine a type of the temporal expression as a function of the text, and map the temporal expression and the type on a prediction of a value of the temporal expression in a context-free representation of the temporal expression, wherein:

a model is configured to map the temporal expression and the type on the prediction, the temporal expression and the type being mapped on the prediction using the model, and the temporal expression is provided, the context-free representation being provided, and the model is trained as a function of the temporal expression and of the context-free representation to map the temporal expression on a prediction for the context-free representation.

12. A non-transitory computer-readable medium on which is stored a computer program including computer-readable instructions for processing temporal expressions from unstructured texts for filling a knowledge database, the instructions, when executed by a computer, causing the computer to perform the following steps:

determining a temporal expression in a text;

determining a type of the temporal expression as a function of the text; and mapping the temporal expression and the type on a prediction of a value of the temporal expression in a context-free representation of the temporal expression, wherein:

a model is configured to map the temporal expression and the type on the prediction, the temporal expression and the type being mapped on the prediction using the model, and the temporal expression is provided, the context-free representation being provided, and the model is trained as a function of the temporal expression and of the context-free representation to map the temporal expression on a prediction for the context-free representation.

* * * * *